United States Patent
Ott et al.

(10) Patent No.: US 12,435,783 B1
(45) Date of Patent: Oct. 7, 2025

(54) GEARBOX HEAT RECOVERY SYSTEM

(71) Applicant: Textron Innovations Inc., Providence, RI (US)

(72) Inventors: Charles Jared Ott, Keller, TX (US); Brad Ekstrom, Fort Worth, TX (US); Alan Wayne Falls, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/814,085

(22) Filed: Aug. 23, 2024

(51) Int. Cl.
*F16H 57/04* (2010.01)
*F02C 6/04* (2006.01)
*F02C 6/08* (2006.01)
*F01P 3/20* (2006.01)

(52) U.S. Cl.
CPC .......... *F16H 57/0413* (2013.01); *F02C 6/08* (2013.01); *F01P 3/20* (2013.01); *F01P 2025/36* (2013.01); *F02C 6/04* (2013.01)

(58) Field of Classification Search
CPC .......... F16H 57/0413; F02C 6/04; F02C 6/08; F02C 9/18; F01P 2025/36; F01P 3/20
See application file for complete search history.

(56) References Cited

U.S. PATENT DOCUMENTS

| | | | |
|---|---|---|---|
| 6,427,640 B1 * | 8/2002 | Hickey | F16H 57/0412 123/41.31 |
| 9,452,660 B2 * | 9/2016 | Sheppard | B60H 1/00314 |
| 9,796,244 B2 * | 10/2017 | Cook | B60H 1/04 |
| 11,248,519 B2 * | 2/2022 | Gerges | F28F 27/02 |
| 11,577,831 B2 | 2/2023 | Schank | |
| 11,964,757 B2 | 4/2024 | Beall et al. | |
| 2011/0284309 A1 * | 11/2011 | Gooden | F01P 7/16 180/339 |
| 2017/0144746 A1 | 5/2017 | Schank et al. | |
| 2020/0248620 A1 * | 8/2020 | Zysman | F02C 7/14 |

FOREIGN PATENT DOCUMENTS

EP      3127814 A1 *  2/2017  ............. B64D 15/06

* cited by examiner

*Primary Examiner* — Tinh Dang
(74) *Attorney, Agent, or Firm* — Akona IP PC

(57) ABSTRACT

A system for warming lubricant of a gearbox includes a heat exchanger connected to the gearbox, the gearbox configured to send the lubricant to the heat exchanger and the heat exchanger configured to receive the lubricant from the gearbox, warm the received lubricant using bleed air from an engine located proximate the heat exchanger, and return the warmed lubricant to the gearbox.

19 Claims, 8 Drawing Sheets

GEARBOX HEAT RECOVERY SYSTEM

STATEMENT REGARDING FEDERALLY SPONSORED RESEARCH OR DEVELOPMENT

This invention was made with U.S. Government support under Agreement No. HR0011-23-9-0148 awarded by DARPA. The Government has certain rights in the invention.

TECHNICAL FIELD

This disclosure relates in general to the field of aircraft and, more particularly, though not exclusively, to heat recovery systems for gearboxes for such aircraft.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff, and landing (VTOL) aircraft do not require runways. Instead, VTOL aircraft are capable of taking off, hovering, and landing vertically. One example of a VTOL aircraft is a helicopter which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

In particular tiltrotor aircraft, one or more proprotor assemblies, including corresponding propulsion assemblies, may be disengaged during certain modes of operation of the aircraft. Prolonged operation in such modes of operation may result in cooling of gearbox oil to a degree that the oil will be too viscous to properly lubricate the components of the gearbox when the aircraft returns to a mode of operation in which the one or more propulsion assemblies are reengaged.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
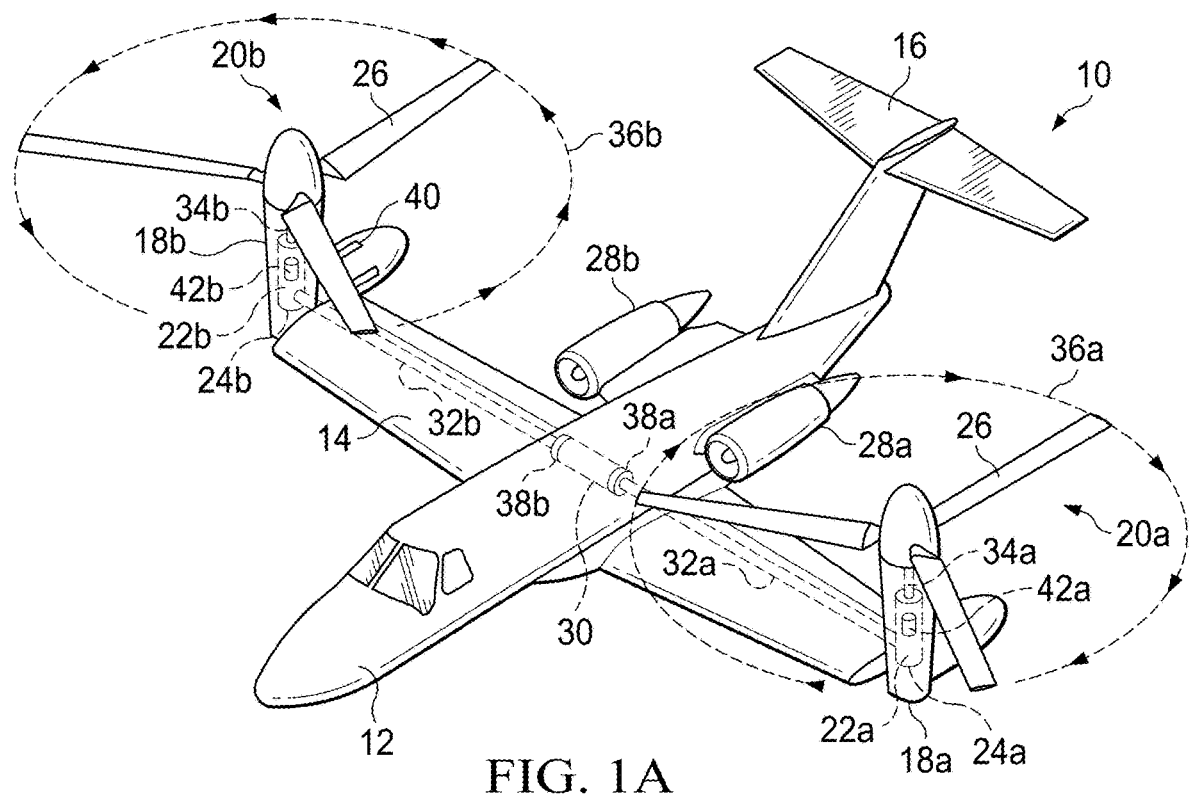
FIGS. 1A-1D are schematic illustrations of a tiltrotor aircraft in various flight modes in accordance with example embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
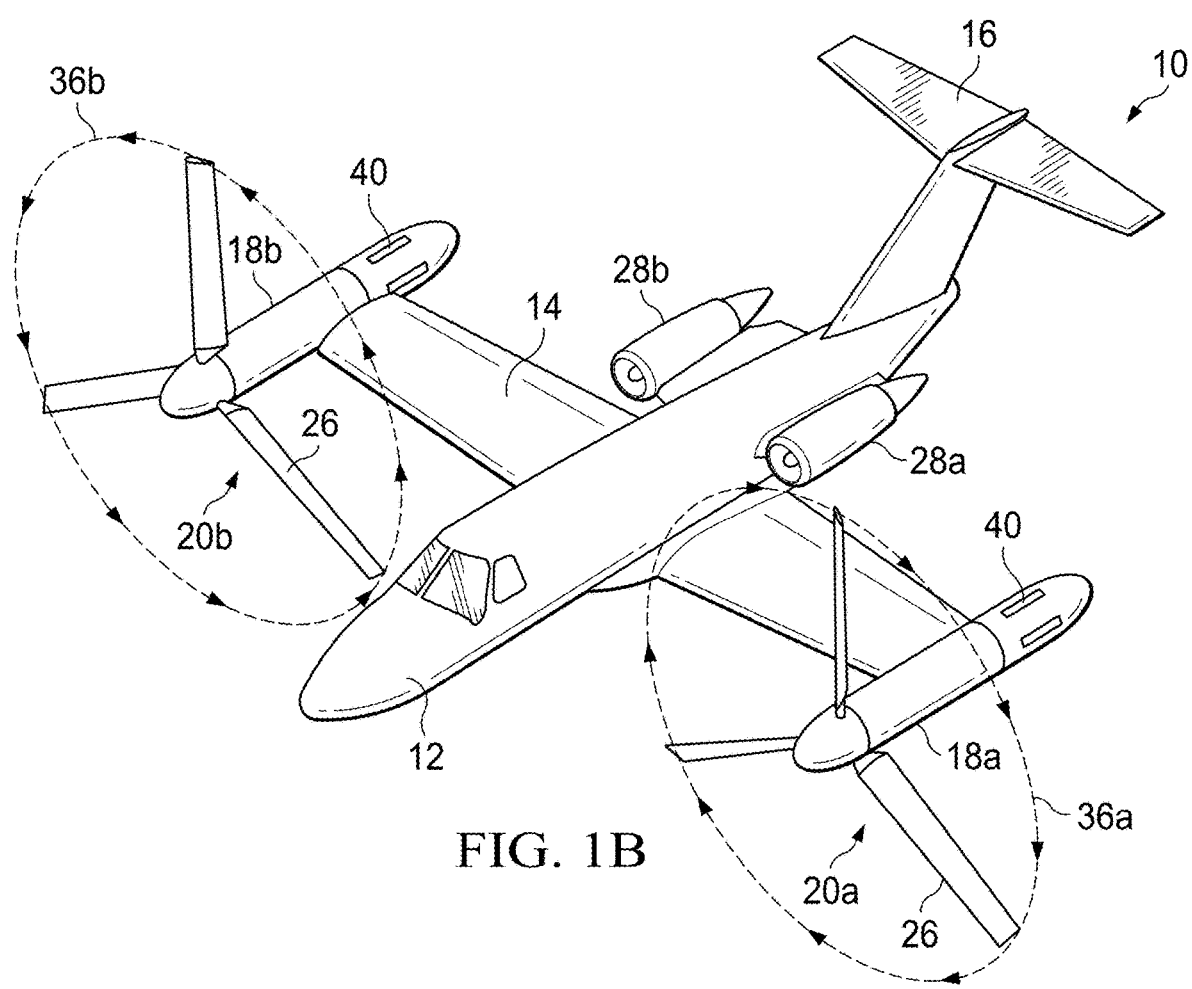
Figure 1C:
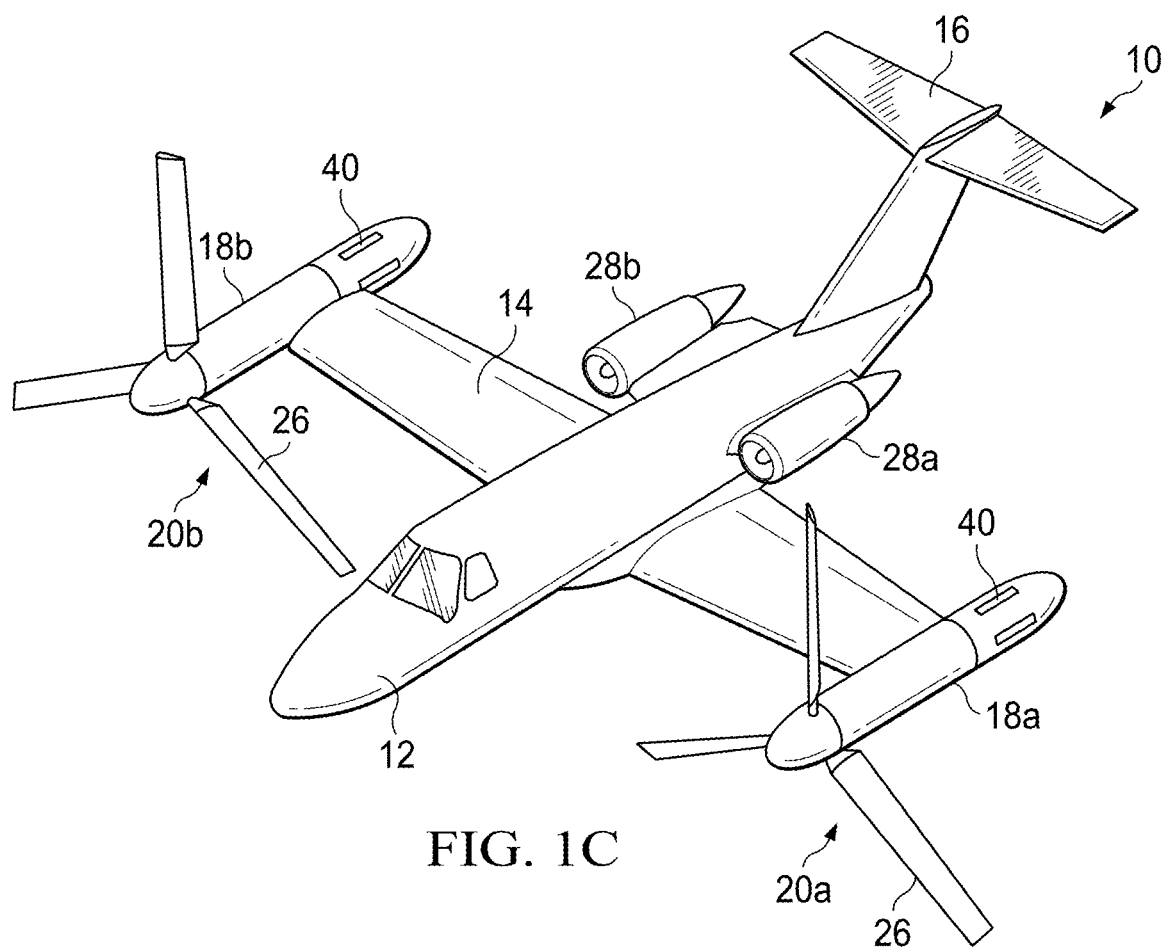
Figure 1D:
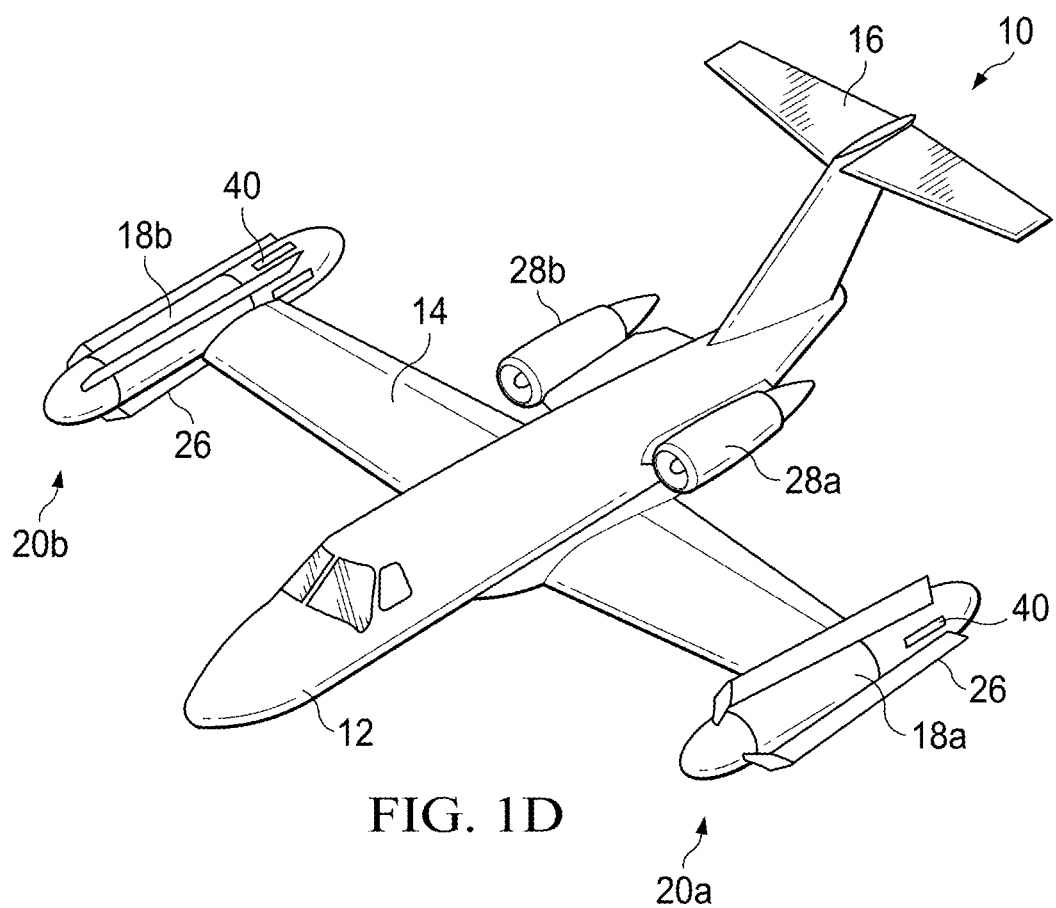

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b, that are tiltable relative to wing 14 between a generally vertical orientation, as best illustrated in FIG. 1A, and a generally horizontal orientation, as best illustrated in FIGS. 1B-1D. Pylon assemblies 18a, 18b, each house a portion of the drive system that is used to rotate rotor assemblies depicted as proprotor assemblies 20a, 20b, respectively. For example, a proprotor gearbox 22a is housed within pylon assembly 18a and a proprotor gearbox 22b is housed within pylon assembly 18b. Proprotor gearbox 22a includes a proprotor gearbox housing 24a that is part of the nonrotating airframe structure of aircraft 10. Similarly, proprotor gearbox 22b includes a proprotor gearbox housing 24b that is part of the nonrotating airframe structure of aircraft 10. Disposed within each of proprotor gearbox 22a and proprotor gearbox 22b is a plurality of gears, such as planetary gears, used to adjust the engine output to a suitable rotational speed so that the engines and the proprotor assemblies may rotate at optimum speeds in the rotary flight modes of aircraft 10.

Each proprotor assembly 20a, 20b, includes a plurality of proprotor blades 26 that are operable to be rotated, as best illustrated in FIGS. 1A-1B, operable to be feathered, stopped, clocked and locked, as best illustrated in FIG. 1C and operable to be folded, as best illustrated in FIG. 1D. Proprotor assembly 20a is rotated responsive to torque and rotational energy provided by one or both of engines 28a, 28b, via a mid-wing gearbox 30, a drive shaft 32a, proprotor gearbox 22a and a drive shaft depicted as mast 34a. Similarly, proprotor assembly 20b is rotated responsive to torque and rotational energy provided by one or both of engines 28a, 28b, via mid-wing gearbox 30, a drive shaft 32b, proprotor gearbox 22b and a drive shaft depicted as mast 34b. Engines 28a, 28b, may be located along an aft portion of fuselage 12. Engines 28a, 28b, may be operated in a turboshaft mode, as best illustrated in FIGS. 1A-1B or a turbofan mode, as best illustrated in FIGS. 1C-1D. Although not explicitly shown in FIGS. 1A-1D, it will be recognized that engines 28a, 28b, may include various conventional jet engine components, including one or more of a fan, a compressor, a combustor, a turbine, a mixer, and a nozzle.

FIG. 1A illustrates aircraft 10 in VTOL or helicopter flight mode, in which proprotor assemblies 20a, 20b, are rotating in a substantially horizontal plane to provide vertical lift, such that aircraft 10 flies much like a conventional helicopter. In this configuration, engines 28a, 28b, are operating in turboshaft mode wherein hot combustion gases in each engine 28a, 28b, cause rotation of a power turbine coupled to a respective input shaft of mid-wing gearbox 30. Thus, in this configuration, aircraft 10 is considered to be in a rotary flight mode as proprotor assemblies 20a, 20b, are rotating and operable to provide thrust for aircraft 10. FIG. 1B illustrates aircraft 10 in proprotor forward flight mode, in which proprotor assemblies 20a, 20b, are rotating in a substantially vertical plane to provide a forward thrust enabling wing 14 to provide a lifting force responsive to the forward airspeed, such that aircraft 10 flies much like a conventional propeller driven aircraft. In this configuration, engines 28a, 28b, are operating in the turboshaft mode and aircraft 10 is considered to be in the rotary flight mode.

In the rotary flight mode of aircraft 10, proprotor assemblies 20a, 20b, rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 36a, and proprotor assembly 20b rotates counterclockwise, as indicated by motion arrows 36b. In the illustrated embodiment, proprotor assemblies 20a, 20b, each include three proprotor blades 26 that are uniformly spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20b are selectively positioned between proprotor forward flight mode and helicopter mode, which can be referred to as a conversion flight mode.

FIG. 1C illustrates aircraft 10 in transition between proprotor forward flight mode and airplane forward flight mode, in which engines 28a, 28b, have been disengaged from proprotor assemblies 20a, 20b, and proprotor blades 26 have been feathered, or oriented to be streamlined in the direction of flight, such that proprotor blades 26 act as brakes to aerodynamically slow the rotation of proprotor assemblies 20a, 20b. Alternatively or additionally, the rotation of proprotor assemblies 20a, 20b, may be slowed or stopped using brake systems 38a, 38b, that are operably associated with mid-wing gearbox 30, as best illustrated in FIG. 1A. In other embodiments, brake systems could be positioned at other locations along drive shafts 32a, 32b. Preferably, brake systems 38a, 38b, include position sensors such that drive shafts 32a, 32b, can be stopped at predetermined rotational positions. By stopping drive shafts 32a, 32b, in known rotational positions, the rotational position of each proprotor assembly 20a, is also known. This rotational clocking of proprotor blades 26 is important to prevent contact with wing 14 during blade folding and to align each proprotor blade 26 with a respective blade grip 40 operably associated with pylon assemblies 18a, 18b, for blade folding.

Due to the distance between brake systems 38a, 38b, and proprotor assemblies 20a, as well as the gear systems therebetween, however, use of the position sensors may result in only a coarse rotational clocking of proprotor assemblies 20a, 20b. Once proprotor assemblies 20b have been slowed or stopped and have been coarsely rotationally clocked, proprotor lockout systems 42a, 42b, disposed within proprotor gearboxes 22a, 22b, are shifted from a disengaged position to an engaged position to lock proprotor assemblies 20a, 20b, against rotation and to precisely rotationally clock proprotor assemblies 20a, 20b, such that each proprotor blade 26 will be circumferentially aligned with one of blade grips 40 for blade folding. In the illustrated configuration of aircraft 10 in FIG. 1C, engines 28a, 28b, are operating in turbofan mode wherein hot combustion gases in each engine 28a, 28b, cause rotation of a power turbine coupled to an output shaft that is used to power a turbofan that forces bypass air through a fan duct to create forward thrust enabling wing 14 to provide a lifting force responsive to the forward airspeed, such that aircraft 10 flies much like a conventional jet aircraft. In this configuration, aircraft 10 is considered to be in a non-rotary flight mode as proprotor assemblies 20a, 20b, are no longer rotating and thus, not providing thrust for aircraft 10.

FIG. 1D illustrates aircraft 10 in high speed airplane forward flight mode, in which proprotor blades 26 have been folded and are oriented substantially parallel to respective pylon assemblies 18a, 18b, to minimize the drag force generated by proprotor blades 26. To prevent chatter or other movement of proprotor blades 26 when folded, proprotor blades 26 are preferably received within blade grips 40 of pylon assemblies 18a, 18b. In this configuration, engines 28a, 28b are operating in the turbofan mode and aircraft 10 is considered to be in the non-rotary flight mode. The forward cruising speed of aircraft 10 can be significantly higher in airplane forward flight mode versus proprotor forward flight mode as the risk of forward airspeed induced proprotor aeroelastic instability has been removed.

Even though aircraft 10 has been described as having two engines fixed to the fuselage, it should be understood by those having ordinary skill in the art that other engine arrangements are possible and are considered to be within the scope of the present disclosure including, for example, having a single engine that provides torque and rotational energy to both of the proprotor assemblies. In addition, it should be appreciated that tiltrotor aircraft 10 is merely illustrative of a variety of aircraft that can implement the embodiments disclosed herein. Indeed, the proprotor lockout systems of the present disclosure may be utilized on any type of rotorcraft in which locking of a rotor system against rotation during flight or during storage is desired. Other aircraft implementations can include helicopters, quad tiltrotor aircraft, hybrid aircraft, compound aircraft, unmanned aerial systems and the like. As such, those having ordinary skill in the art will recognize that the proprotor lockout systems disclosed herein can be integrated into a variety of aircraft configurations. It should be appreciated that even though aircraft are particularly well-suited to implement the embodiments of the present disclosure, non-aircraft vehicles and devices can also implement the embodiments.

Even though aircraft 10 has been described as having proprotor lockout systems 42a, 42b, disposed within proprotor gearboxes 22a, 22b, it should be understood by those having ordinary skill in the art that proprotor lockout systems could be positioned at any location along the proprotor drive shaft.

Figure 2A:
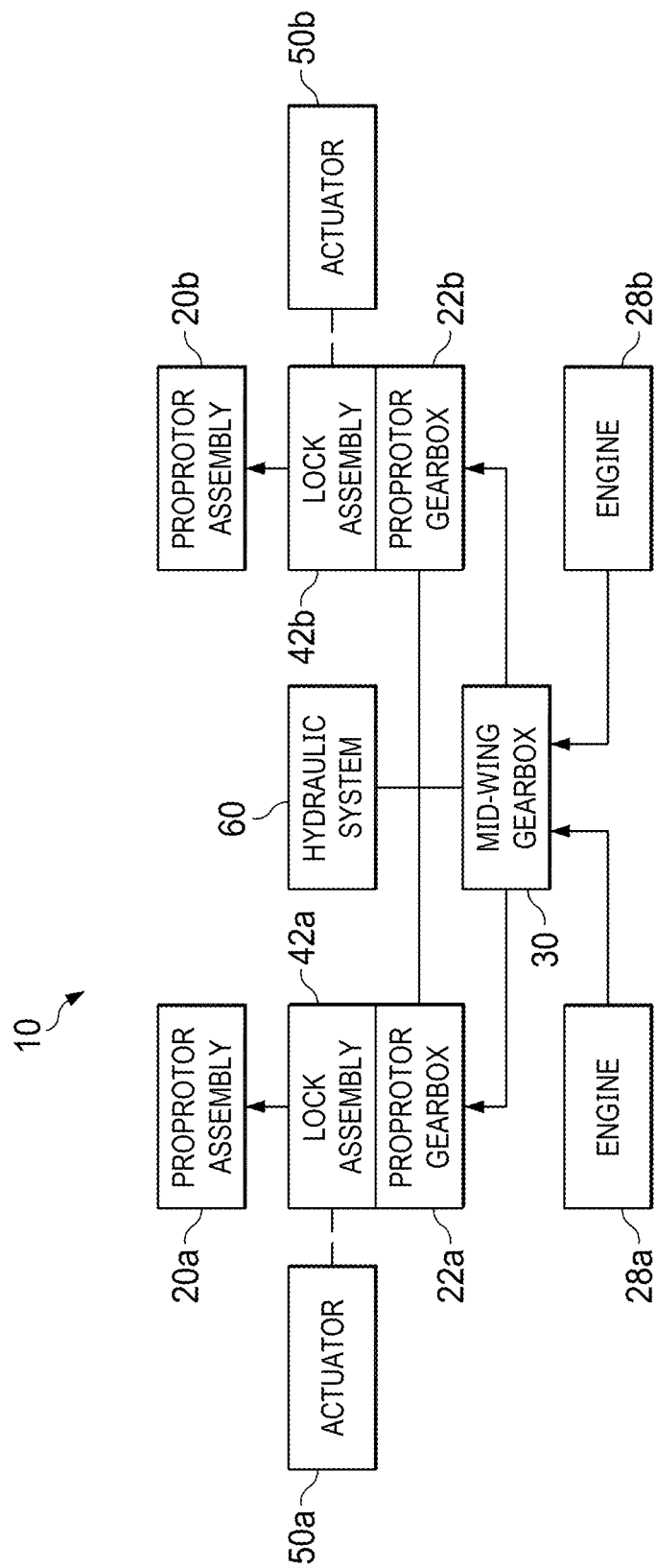
FIGS. 2A-2B are mechanical system block diagrams of the tiltrotor aircraft of FIGS. 1A-1D in which gearbox heat recovery systems may be implemented in accordance with example embodiments of the present disclosure.
Figure 2B:
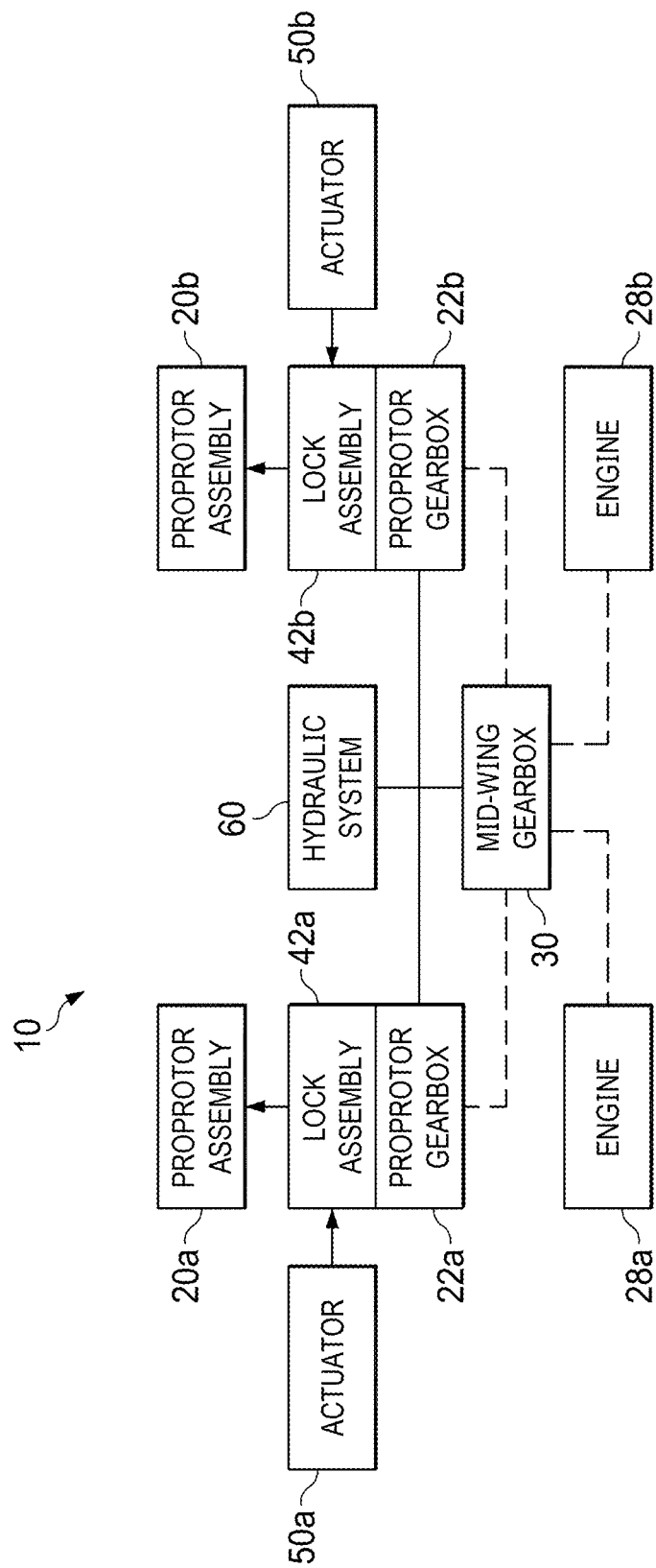

Referring next to FIGS. 2A-2B in the drawings, various mechanical systems of tiltrotor aircraft 10 are depicted in a block diagram format. Aircraft 10 includes a powerplant depicted as engines 28a, 28b, that have turboshaft modes, represented in FIG. 2A, and turbofan modes, represented in FIG. 2B. In their turboshaft modes, engines 28a, 28b provide torque and rotational energy to mid-wing gearbox 30, as indicated by the arrows therebetween. Mid-wing gearbox 30 receives torque and rotational energy from one or both of engines 28a, 28b, and provides torque and rotational energy to proprotor gearboxes 22a, 22b, as indicated by the arrows therebetween. Proprotor gearbox 22a receives torque and rotational energy from mid-wing gearbox 30 and provides torque and rotational energy to proprotor assembly 20a, as indicated by the arrow therebetween. Proprotor gearbox 22b receives torque and rotational energy from mid-wing gearbox 30 and provides torque and rotational energy to proprotor assembly 20b, as indicated by the arrow therebetween.

When it is desired to transition aircraft 10 from proprotor forward flight mode to airplane forward flight mode, engines 28a, 28b, are disengaged from proprotor assemblies 20a, as indicated by the dashed lines between engines 28a, 28b, mid-wing gearbox 30 and proprotor gearboxes 22a, 22b, in FIG. 2B. The proprotor blades may now be feathered for aerodynamic braking and/or brake systems may be used to slow or fully stop the rotation of proprotor assemblies 20a, 20b. Thereafter, aircraft 10 uses lock assemblies 42a, 42b to stop, clock and lock proprotor assemblies 20a, 20b. Lock assemblies 42a, 42b, may be positioned between any non-rotating airframe structure and any portion of the drive shafts providing torque and rotational energy from engines 28a, 28b, to proprotor assemblies 20a, 20b. In the illustrated embodiment, lock assemblies 42a, 42b, are proximate to or within proprotor gearboxes 22a, 22b. As discussed herein, lock assemblies could alternatively be located between mid-wing gearbox and proprotor gearboxes 22a, 22b, proximate to or within mid-wing gearbox 30 or other suitable location along the drive shafts. As discussed herein, each lock assembly 42a, 42b, has a rotating lock member that is operably associated with the drive shaft and a nonrotating lock member that is operably associated with nonrotating airframe structure.

During rotary flight modes, respective rotating lock members and nonrotating lock members are disengaged from one another. During airplane forward flight mode, respective rotating lock members and nonrotating lock members are engaged with one another. Lock assembly 42a is shifted between the disengaged and the engaged positions by actuator 50a. Lock assembly 42b is shifted between the disengaged and the engaged positions by actuator 50b. Actuators 50a, 50b, may be hydraulically operated actuators, electrically operated actuators including linear actuators and rotary actuators or other suitable types of actuators.

Once rotation of proprotor assemblies 20a, 20b, has been suitably slowed or fully stopped, actuators 50a, 50b, are activated, as indicated by the arrows in FIG. 2B, to shift lock assemblies 42a, 42b, from disengaged positions to engaged positions, preventing rotation of proprotor assemblies 20a, 20b, and clocking the proprotor blades to be in rotational alignment with respective blade grips as discussed herein. When it is desired to transition aircraft 10 from the airplane forward flight mode back to the proprotor forward flight mode, actuators 50a, 50b, are activated, as indicated by the arrows in FIG. 2B, to shift lock assemblies 42a, 42b, from engaged positions to disengaged positions to allow rotation of proprotor assemblies 20a, 20b. Thereafter, engines 28a, 28b, are reengaged with proprotor assemblies 20a, 20b, as indicated by the arrows between engines 28a, 28b, mid-wing gearbox 30 and proprotor gearboxes 22a, 22b, in FIG. 2A, returning aircraft 10 to the rotary flight mode.

A hydraulic system 60 is provided for powering various mechanical components and machinery of aircraft 10 in a conventional manner. For example, hydraulic system 60 may be used to control landing gear, wheel brakes, and nose wheel steering, among other systems and components.

Figure 3:
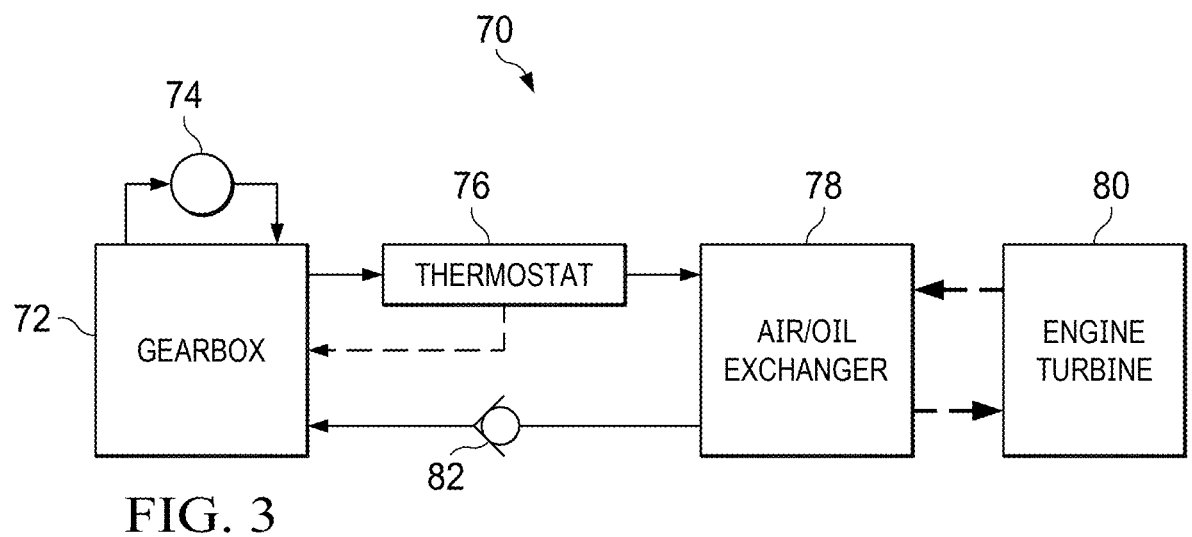
FIG. 3 is a mechanical system block diagram of a gearbox heat recovery system in accordance with one example embodiment of the present disclosure.

FIG. 3 is a mechanical system block diagram of a gearbox heat recovery system 70 in accordance with one example embodiment of the present disclosure. As shown in FIG. 3, system 70 includes a gearbox 72, which may be any of gearboxes 22a, 22b, or 30, for example. In the illustrated embodiment, an electric pump 74 is provided for motivating movement of gearbox oil while the mechanical system in which gearbox 72 forms a part is stationary (e.g., in airplane forward flight mode, such as illustrated in FIG. 1C). System 70 further includes a thermostat 76, a heat exchanger 78, a turbine 80 (which may comprise part of one of engines 28a, 28b), and a check valve 82.

In operation, heat exchanger 78 captures heat in the form of bleed air from turbine 80 while the aircraft is operating in turbofan mode to warm the oil of gearbox 72 to prevent the oil from becoming too viscous while the proprotor drive system is not operational during flight (such as during airplane forward flight mode). This enables the dynamic system to re-engage quickly during flight when the aircraft returns to turboshaft mode.

Thermostat 76 receives oil from gearbox 72 and sends it to heat exchanger 78 if the oil temperature is below a predetermined minimum threshold temperature, which in particular embodiments is approximately room temperature. Oil above the temperature threshold is returned to gearbox 72 rather than being sent to heat exchanger 78. Thermostat 76 may be electronically controlled or may be implemented as a mechanical (e.g., bimetallic) device. Thermostat 76 may include a second thermostat, which may be deployed to prevent gearbox oil having a temperature above a predetermined threshold maximum temperature from being forwarded to heat exchanger 78 to prevent overheating of the oil. Check valve 82 may optionally be provided to prevent back flow into heat exchanger 78 of cooled oil being returned from heat exchanger to gearbox 72.

Figure 4:
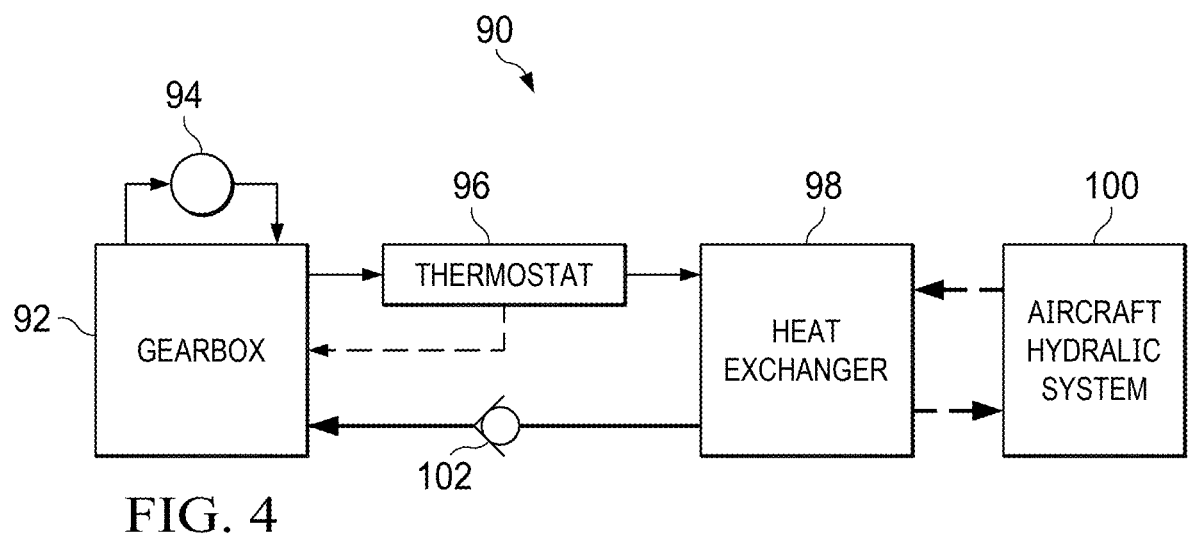
FIG. 4 is a mechanical system block diagram of a gearbox heat recovery system in accordance with another example embodiment of the present disclosure.

FIG. 4 is a mechanical system block diagram of a gearbox heat recovery system 90 in accordance with another example embodiment of the present disclosure. As shown in FIG. 4, system 90 includes a gearbox 92, which may be any of gearboxes 22a, 22b, or 30, for example. In the illustrated embodiment, an electric pump 94 is provided for motivating movement of gearbox oil while the mechanical system in which gearbox 92 forms a part is stationary (e.g., in airplane forward flight mode, such as illustrated in FIG. 1C). System 90 further includes a thermostat 96, a heat exchanger 98, a hydraulic system 100 (which may be similar in all relevant respects to hydraulic system 60 (FIGS. 2A and 2B), and a check valve 92.

In operation, heat exchanger 98 captures heat generated by hydraulic system 100 while the aircraft is operating in turbofan mode to warm the oil of gearbox 92 to prevent the oil from becoming too viscous while the proprotor drive system is not operational during flight (such as during airplane forward flight mode). This enables the dynamic system to re-engage quickly during flight when the aircraft returns to turboshaft mode.

Thermostat 96 receives oil from gearbox 92 and sends it to heat exchanger 98 if the oil temperature is below a predetermined minimum threshold temperature, which in particular embodiments is approximately room temperature. Oil above the temperature threshold is returned to gearbox 92 rather than being sent to heat exchanger 98. Thermostat 96 may be electronically controlled or may be implemented as a mechanical (e.g., bimetallic) device. Thermostat 96 may include a second thermostat, which may be deployed to prevent gearbox oil having a temperature above a predetermined threshold maximum temperature from being forwarded to heat exchanger 98 to prevent overheating of the oil. Check valve 102 may optionally be provided to prevent back flow into heat exchanger 98 of cooled oil being returned from heat exchanger to gearbox 92.

It will be recognized that heat exchanger 78 is configured as an air-(or vapor-) to-fluid heat exchanger and heat exchanger 98 is configured as a fluid-to-fluid heat exchanger. One or both of heat exchangers 78, 98, may be configured as one or more of a finned tube heat exchanger, a shell-and-tube heat exchanger, a plate heat exchanger (e.g., shell-and-plate or plate- and frame), or a gasket plate heat exchanger, for example.

In particular arrangements of aircraft 10, system 70 may be used to heat oil of gearbox 30 and system 90 may be used to heat oil of gearboxes 22a, 22b, due to relative locations of gearboxes 30, 28a, 28b, throughout aircraft. Additionally, it will be recognized that the term gearbox oil as used herein may refer to any viscous fluid (i.e., lubricant) appropriate for lubrication of gearbox components.

Example 1 provides a system for warming lubricant of a gearbox, the system including a heat exchanger connected to the gearbox, the gearbox configured to send the lubricant to the heat exchanger and the heat exchanger configured to receive the lubricant from the gearbox, warm the received lubricant using bleed air from an engine located proximate the heat exchanger, and return the warmed lubricant to the gearbox.

Example 2 provides the system of example 1, further including a thermostat connected between the gearbox and the heat exchanger, in which the lubricant from the gearbox is prevented from being received by the heat exchanger unless a temperature of the lubricant is less than a minimum threshold temperature.

Example 3 provides the system of example 2, in which the thermostat includes a first thermostat, the system further including a second thermostat, in which the lubricant from the gearbox is prevented from being received by the heat exchanger if the temperature of the lubricant is greater than a maximum threshold temperature.

Example 4 provides the system of example 2 or 3, in which the minimum threshold temperature is in a temperature range sufficient to cause the lubricant to reach a maximum operational viscosity.

Example 5 provides the system of any one of examples 1-4, further including an electric pump configured to motivate the lubricant within the gearbox.

Example 6 provides the system of any one of examples 1-5, further including a check valve for preventing backflow of the warmed lubricant into heat exchanger.

Example 7 provides a system for warming lubricant of a gearbox, the system including a heat exchanger connected to the gearbox, the gearbox configured to send the lubricant to the heat exchanger and the heat exchanger configured to receive the lubricant from the gearbox, warm the received lubricant using fluid from a hydraulic system proximate the heat exchanger, and return the warmed lubricant to the gearbox.

Example 8 provides the system of example 7, further including a thermostat connected between the gearbox and the heat exchanger, in which the lubricant from the gearbox is prevented from being received by the heat exchanger unless a temperature of the lubricant is less than a minimum threshold temperature.

Example 9 provides the system of example 8, in which the thermostat includes a first thermostat, the system further including a second thermostat, in which the lubricant from the gearbox is prevented from being received by the heat exchanger if the temperature of the lubricant is greater than a maximum threshold temperature.

Example 10 provides the system of example 8 or 9, in which the minimum threshold temperature is in a temperature range sufficient to cause the lubricant to reach a maximum operational viscosity.

Example 11 provides the system of any one of examples 7-10, further including an electric pump configured to motivate the lubricant within the gearbox.

Example 12 provides the system of any one of examples 7-11, further including a check valve for preventing backflow of the warmed lubricant into heat exchanger.

Example 13 provides an aircraft including a gearbox including lubricant; a heat exchanger connected to the gearbox; at least one engine; and a hydraulic system, in which the gearbox is configured to send the lubricant to the heat exchanger, and in which the heat exchanger configured to receive the lubricant from the gearbox, warm the received lubricant using at least one of fluid of the hydraulic system and bleed air from the at least one engine, and return the warmed lubricant to the gearbox.

Example 14 provides the aircraft of example 13, further including a thermostat connected between the gearbox and the heat exchanger, in which the lubricant from the gearbox is prevented from being received by the heat exchanger unless a temperature of the lubricant is less than a minimum threshold temperature.

Example 15 provides the aircraft of example 14, in which the thermostat includes a first thermostat, the system further including a second thermostat, in which the lubricant from the gearbox is prevented from being received by the heat exchanger if the temperature of the lubricant is greater than a maximum threshold temperature.

Example 16 provides the aircraft of example 14 or 15, in which the minimum threshold temperature is in a temperature range sufficient to cause the lubricant to reach a maximum operational viscosity.

Example 17 provides the aircraft of any one of examples 13-16, further including an electric pump configured to motivate the lubricant within the gearbox.

Example 18 provides the aircraft of any one of examples 13-17, further including a check valve for preventing backflow of the warmed lubricant into heat exchanger.

Example 19 provides the aircraft of any one of examples 13-18, in which the gearbox is located in a wing of the aircraft and the heat exchanger warms the received lubricant using the fluid of the hydraulic system.

Example 20 provides the aircraft of any one of examples 13-19, in which the gearbox is located in a main fuselage of the aircraft and the heat exchanger warms the received lubricant using the bleed air from the at least one engine.

Various embodiments are disclosed, and variations, combinations, and/or modifications of the embodiment(s) and/or features of the embodiments made by a person having ordinary skill in the art are within the scope of the disclosure. Alternative embodiments that result from combining, integrating, and/or omitting features of the embodiments are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A system for warming lubricant of a gearbox, the system comprising a heat exchanger connected to the gearbox, the gearbox configured to send the lubricant to the heat exchanger and the heat exchanger configured to receive the lubricant from the gearbox, warm the received lubricant using bleed air from an engine located proximate the heat exchanger, and return the warmed lubricant to the gearbox.

2. The system of claim 1, further comprising a thermostat connected between the gearbox and the heat exchanger, wherein the lubricant from the gearbox is prevented from being received by the heat exchanger unless a temperature of the lubricant is less than a minimum threshold temperature.

3. The system of claim 2, wherein the thermostat comprises a first thermostat, the system further comprising a second thermostat, wherein the lubricant from the gearbox is prevented from being received by the heat exchanger if the temperature of the lubricant is greater than a maximum threshold temperature.

4. The system of claim 2, wherein the minimum threshold temperature is in a temperature range sufficient to cause the lubricant to reach a maximum operational viscosity.

5. The system of claim 1, further comprising an electric pump configured to motivate the lubricant within the gearbox.

6. The system of claim 1, further comprising a check valve for preventing backflow of the warmed lubricant into heat exchanger.

7. A system for warming lubricant of a gearbox, the system comprising:
a heat exchanger connected to the gearbox, the gearbox configured to send the lubricant to the heat exchanger and the heat exchanger configured to receive the lubricant from the gearbox, warm the received lubricant using fluid from a hydraulic system proximate the heat exchanger, and return the warmed lubricant to the gearbox; and
a thermostat connected between the gearbox and the heat exchanger, wherein the lubricant from the gearbox is prevented from being received by the heat exchanger unless a temperature of the lubricant is less than a minimum threshold temperature.

8. The system of claim 7, wherein the thermostat comprises a first thermostat, the system further comprising a second thermostat, wherein the lubricant from the gearbox is prevented from being received by the heat exchanger if the temperature of the lubricant is greater than a maximum threshold temperature.

9. The system of claim 7, wherein the minimum threshold temperature is in a temperature range sufficient to cause the lubricant to reach a maximum operational viscosity.

10. The system of claim 7, further comprising an electric pump configured to motivate the lubricant within the gearbox.

11. The system of claim 7, further comprising a check valve for preventing backflow of the warmed lubricant into heat exchanger.

12. An aircraft comprising:
a gearbox comprising lubricant;
a heat exchanger connected to the gearbox;
at least one engine; and
a hydraulic system,
wherein the gearbox is configured to send the lubricant to the heat exchanger, and
wherein the heat exchanger configured to receive the lubricant from the gearbox, warm the received lubricant using at least one of fluid of the hydraulic system and bleed air from the at least one engine, and return the warmed lubricant to the gearbox.

13. The aircraft of claim 12, further comprising a thermostat connected between the gearbox and the heat exchanger, wherein the lubricant from the gearbox is prevented from being received by the heat exchanger unless a temperature of the lubricant is less than a minimum threshold temperature.

14. The aircraft of claim 13, wherein the thermostat comprises a first thermostat, the system further comprising a second thermostat, wherein the lubricant from the gearbox is prevented from being received by the heat exchanger if the temperature of the lubricant is greater than a maximum threshold temperature.

15. The aircraft of claim 13, wherein the minimum threshold temperature is in a temperature range sufficient to cause the lubricant to reach a maximum operational viscosity.

16. The aircraft of claim 12, further comprising an electric pump configured to motivate the lubricant within the gearbox.

17. The aircraft of claim 12, further comprising a check valve for preventing backflow of the warmed lubricant into heat exchanger.

18. The aircraft of claim 12, wherein the gearbox is located in a wing of the aircraft and the heat exchanger warms the received lubricant using the fluid of the hydraulic system.

19. The aircraft of claim 12, wherein the gearbox is located in a main fuselage of the aircraft and the heat exchanger warms the received lubricant using the bleed air from the at least one engine.

* * * * *